United States Patent [19]
Terbrack

[11] 3,842,347
[45] Oct. 15, 1974

[54] RATE MEASUREMENT CIRCUIT
[75] Inventor: William H. Terbrack, Tustin, Calif.
[73] Assignee: Gardner-Denver Company, Quincy, Ill.
[22] Filed: July 3, 1973
[21] Appl. No.: 376,187

[52] U.S. Cl. .............................. 324/78 D, 324/186
[51] Int. Cl. ............................................ G01r 23/02
[58] Field of Search ......... 324/79 D, 186, 187, 181, 324/78 D

[56] References Cited
UNITED STATES PATENTS
3,537,003  10/1970  Planta et al. ..................... 324/186 X Primary Examiner—Alfred E. Smith
Attorney, Agent, or Firm—Lyon and Lyon

[57] ABSTRACT

A time/rate converter measures the elapsed time between two events and generates a count proportional to the elapsed time which is stored in a memory. The count is then compared with a reference count and a signal is added to an output counter every time the count is equal to the reference count. Thus, the output counter accumulates an indication of how many equalities occur between the count and the reference count and an accurate indication of rate is achieved.

8 Claims, 1 Drawing Figure

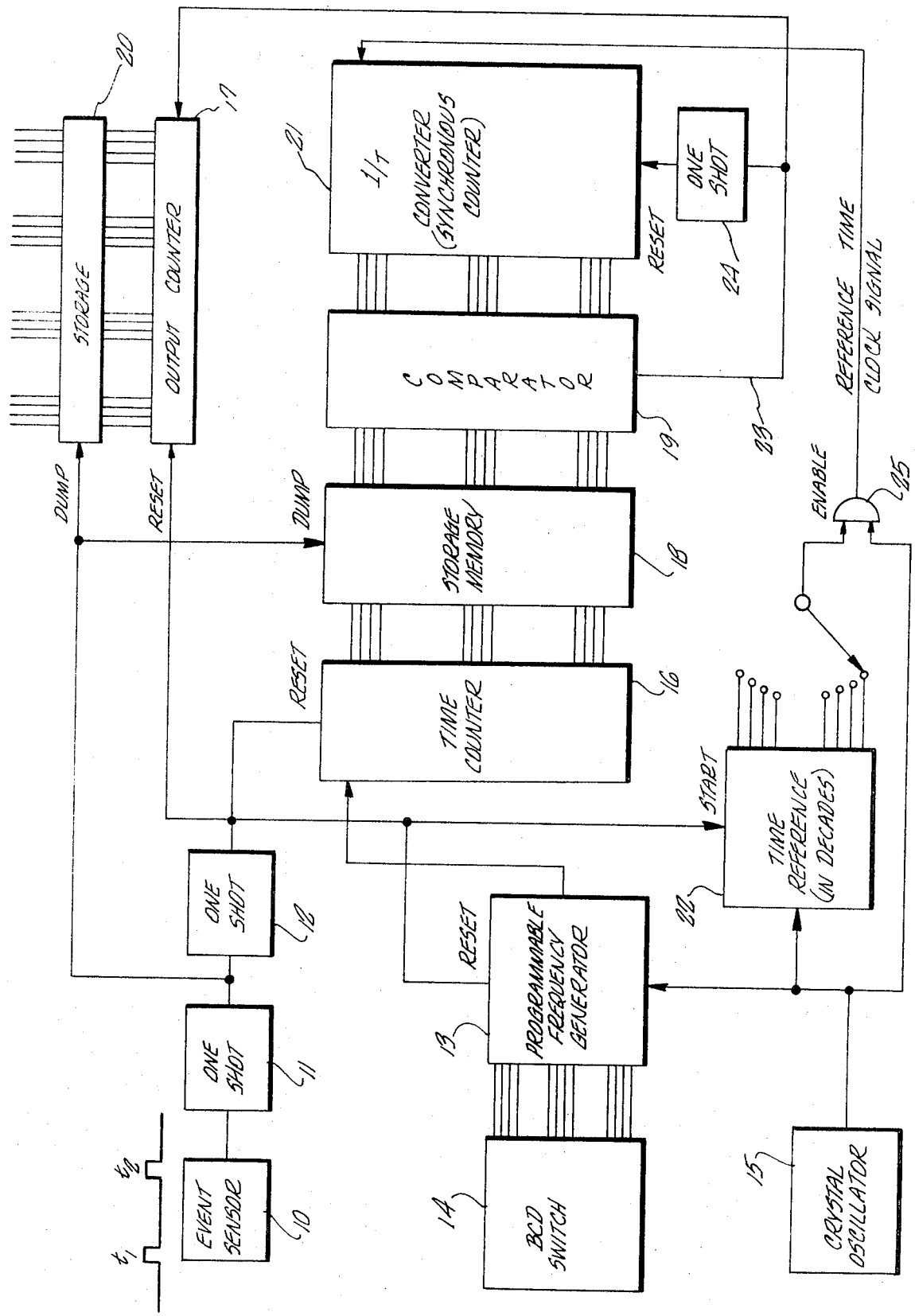

RATE MEASUREMENT CIRCUIT

BACKGROUND OF THE INVENTION

The present invention relates to digital circuitry which accomplishes a rate measurement.

More particularly, the present invention relates to a time/rate converter for measuring the rate of occurrence of events, especially in an environment where the time units involved are not easily measured directly.

A rate measurement is an expression of a ratio or proportion of two measurable physical quantities. The rate is the number of passing events per unit time. In the past, rate measuring was accomplished by estimating or measuring both the events and the time. Time, typically, can be accurately measured, but the time units involved may be very inconvenient to use or rate measurements may be desired before a given time has expired.

It is for this reason that a shorter time reference is used for the measurement of the passing events, which reduces the resolution and accuracy of the measurement proportionally. In addition, a calculation is then usually required to obtain the proper value in the desired energy units.

The desired rate within a given engineering unit of time, e.g. a rate measurement every one-tenth of a second in an RPM reading, was typically accomplished by determining the time required for one complete shaft revolution or a precise known fraction thereof. This, however, resulted in a measurement expressed in units of time/event which is the reciprocal of the desired rate value. In the past, reciprocal counter systems utilized to get the desired rate value were very expensive and complicated.

The rate measurement circuit of this invention may be utilized for rate measurements such as the velocity of bullets, heartbeat and the like, but is especially applicable for measuring the rate of penetration of a drill bit which moves at a relatively slow rate.

It is difficult to accomplish an analog rate measurement if the time involved is approximately one minute per event or longer because of the long time constants involved in the necessary circuit elements (large capacitors, high impedances, etc.). Thus, determining the rate of penetration of a drill bit typically utilized in an oil drilling application is determined by the digital system disclosed herein.

In discussing this system in the environment of oil drilling, some background is herein provided. A crown of an oil well rig typically provides various measurement apparatus related to the drilling operation. This crown includes a series of pulleys or sheeves over which a cable runs from a winch to a block. The block in turn is coupled with a hook which supports the drilling apparatus. The pulleys or sheeves may be very large, and in order to measure certain events such as the rate of penetration of the drill bit, it is necessary to measure the rotation of one of these pulleys. An exemplary pulley may be six feet in diameter and weigh several tons.

Conventional proximity sensor probes of the linearly variable differential transformer-type may be spaced on a pulley in a conventional manner. Any type of metal coming close to the end of the probes (actually the core thereof on which transformer windings are wound) will upset the field of a secondary winding of the probe and provide a small voltage output typically in the millivolt range.

This output signal may be applied through an AC amplifier to an absolute value rectifier, the output of which operates a differential switch. The differential switch typically provides an output signal, such as, either 0 or 12 volts. These signals can be counted to provide signals indicative of events which correspond to increments of rotation of the pulley.

The foregoing difficulties have been substantially eliminated, in a straight-forward manner, by sensing the time between two events and providing a count proportional to this time. It is then determined how often this stored count can be reached within a reference time. If the time between events is very short, the first count is relatively large. On the other hand, if the time between events is long, the first count is large and the number of times a second counter can count up to this large value in a reference time is therefore very small.

SUMMARY OF THE INVENTION

It is therefore an object of this invention to provide a digital time/rate converter or rate measurement circuit which is both practical and simple and also lends itself to be manufactured using integrated circuits.

It is another object of this invention to provide a 1/time calculation to achieve the desired rate value in a straight-forward manner.

BRIEF DESCRIPTION OF THE DRAWING

The invention both as to its organization and principle of operation, together with further objects and advantages thereof, may better be understood by reference to the following detailed description of an embodiment of the invention when taken in conjunction with the accompanying drawing.

The drawing is a system diagram illustrating an exemplary embodiment of the basic concepts of the rate measuring circuit in accordance with this invention.

DETAILED DESCRIPTION OF THE PREFERRED EMBODIMENT

Referring now to the drawing, there is illustrated an event sensor 10 which senses events illustrated as pulses $t_1$ and $t_2$. Many more such events are typically involved, and exemplary of the events are pulses derived during the rotation of a pulley, sheeve, or other similar device as previously described.

The events sensed ($t_1$, $t_2$ etc.) are applied to a first one shot, 11 which is connected to the output of the event sensor 10. The output of the one shot 11 is connected to an input of a second one shot 12 and to inputs of a storage memory unit 18 and an output storage unit 20. When the one shot 11 is triggered, the contents of a time counter 16 are dumped into the storage memory unit 18 and the contents of an output counter unit 17 are dumped into the output storage unit 20, which contents are displayed on a digital display (not shown).

The output of the second one shot 12 is connected to inputs of the output counter 17, the time counter 16, a programmable frequency generator 13 and a time reference unit 22. When the second one shot 12 is triggered, the programmable frequency generator 13, the time counter 16, and the output counter 17 are reset to zero. Further, the time reference unit 22 is initiated and operates in a manner to be described subsequently.

The programmable frequency generator 13 has a reference frequency output range typically from 0.1 hertz to 100,000 hertz with 0.01 percent resolution. Further, it provides as an output a programmable, or selectable frequency as determined by a programmable binary coded decimal (BCD) switch 14 which is connected to an input of the programmable frequency generator 13. A crystal oscillator 15 is connected to inputs of the program frequency generator 13, the time reference unit 22, and an enable gate 25. The crystal oscillator 15 is preferably at a reference oscillator frequency of 10 mhz and provides output signals in the form of count pulses. The oscillator 15 drives the programmable frequency generator 13 which in turn produces a signal output at a frequency which is a function of the settings on the BCD switch 14.

The programmable frequency generator 13 is connected to an input of the time counter 16. The signals or output pulses from the frequency generator 13 are counted by the time counter 16. A preceeding event stored in the one shot 12 having reset the time counter 16 at this time.

After the frequency generator 13 has been reset in a manner previously described, the output pulses therefrom are continuously accumulated by the time counter 16 and the counter 16 will accumulate to a number which is a function of the time between the two events ($t_1$ and $t_2$). A programmable frequency generator with a selectable frequency output is used so that its output frequency can be selected to be a value that will not overflow the time counter 16 during the measurement of the two events. Thus, time measurements are provided over various ranges, such as from 0.0063 seconds to one hour apart.

Assuming, for example, that in making the time measurement between the two events that the time counter 16 becomes 50 percent full and then the second event pulse is received. The contents of the time counter 16 are then shifted to the storage memory 18, and the generator 13 and the time counter 16 are reset to zero. The elapsed time between the two events is now contained in the storage memory 18.

The crystal oscillator 15 provides reference pulses, or clock pulses and the frequency thereof may be a thousand times faster than the count going into the time counter 16 because of the capability of selecting the output frequency of the generator 13. If a measurement between two events takes, for example, 10 minutes, the frequency input to the time counter 16 may be 100 hertz.

In order to obtain "rate," it is determined how often the stored number or first count, which is indicative of the elapsed time between the two events, in storage memory 18 can be reached within a reference time. This is accomplished through the use of a comparator 19 which is connected to the storage memory 18 in a manner well-known in the art. The comparator 19 is further connected in a conventional manner to a 1/T converter or synchronous counter 21. The time reference unit 22 is electrically coupled to a second input of the enable gate 25 which in turn is connected at its output to the converter 21. An output line 23 from the comparator 19 is connected to an input of a third one shot 24 which in turn is connected to an input of the converter 21. The output line 23 from the comparator 19 is also connected to an input of the output counter 17. Thus, the determining of how often the stored number or first count in the storage memory 18 can be reached within a reference time (provided by the time reference unit 22) is accomplished through the use of the comparator 19, the converter 21, the time reference unit 22, the crystal oscillator 15, and the third one shot 24.

In operation, the comparator 19 produces an output signal or pulse on the output line 23 each time the first count stored in the storage memory 18 is reached by the converter (or synchronous counter) 21. The output signal from the comparator 19, on output line 23, are counted by the output counter 17. The converter 21 is reset to zero before the next count pulse is received from the crystal oscillator 15, through the enable gate 25 by the triggering of the third one shot 24 by any output signal from the comparator 19. The converter 21 stops counting at the end of the reference time set by the time reference unit 22. The output counter 17 now contains the rate of the first two events, and its contents are shifted to the output storage unit 20 by the first one shot 11 at the time when the next event is sensed by the event sensor 10. The pulse on one shot 11 starts a new cycle as previously described.

The time elapsed from one event pulse to the next is measured, and upon receipt of the second event pulse, the elapsed time information is stored in a storage memory unit for its later conversion into a rate value. The timing circuitry is also reset to zero and the elapsed time information is again accumulated until the next event pulse is detected. Thus, the end of each time measurement is, at the same time, the start of the next measurement. During the time that the next measurement is made, the reciprocal of the elapsed time information of the previous measurement is determined and this resulting rate value is displayed on a digital display (not shown) connected to the storage unit 20 in a manner well-known in the art.

Thus, the practice of this invention provides a true rate measurement which is both linear and accurate in a relatively straight-forward manner. Despite the straight-forward manner in which this invention is practiced, it has the flexibility to operate advantageously in a plurality of situations.

Thus, when one desires to measure the rate of a drill bit penetration which typically is in the magnitude of 1 foot per hour, the rate measurement circuit of this invention, through its programmable BCD switch will select an output frequency for its programmable generator to be relatively low to enable a long time measurement. Alternatively, measurements may be made of a faster rate, such as that of a pump stroke (typically 250 strokes per minute) which involves a much shorter time between events, and thus the programmable BCD switch selects an output frequency for its programmable generator to be increased to enable a shorter time measurement while achieving good resolution. Additionally, the use of this system enables the final output to be in true engineering units.

The specific circuitry of the units of this invention are believed to be apparent to one skilled in the art. For example, the time reference unit 22 typically includes a frequency divider which accepts an input from the crystal oscillator 15. Thus, the time reference unit will divide the frequency output from the crystal oscillator by a predetermined amount. The duration of the output signal produced by the time reference unit thus becomes an accurate proportion of the crystal oscillator's frequency.

While an embodiment and application of this invention has been shown and described, it will be apparent to those skilled in the art that many more modifications will be possible without departing from the inventive concepts herein described.

What is claimed and desired to be secured by Letters Patent of the United States is:

1. A rate measurement circuit comprising:
   means for measuring each elapsed time interval between successive events and for storing a first count indicative of each elapsed time in a storage memory;
   time reference means for producing signals for a predetermined duration;
   first counter means electrically coupled to said time reference means for counting the signals from said time reference means; and
   comparator means coupled to said storage memory and said first counter means for comparing the first count in said storage memory with the count in said first counter and for providing an output pulse when the first count equals the count in said first counter means, the sum of the output pulses being the rate of the successive events.

2. The rate measurement circuit as in claim 1 wherein said time reference means is variable.

3. The rate measurement circuit as in claim 2 wherein the signals produced by said time reference means are clock pulses.

4. A rate measurement circuit comprising:
   means for measuring elapsed time between two events and for storing a first count indicative of the elapsed time in a storage memory, said means for measuring elapsed time and for storing a first count indicative of the elapsed time includes:
   means for sensing the time between two events,
   a programmable frequency generator having a selectable output frequency electrically coupled to said sensing means and providing output signals for the elapsed time, and
   a second counter electrically coupled to said programmable frequency generator for counting the output signals from said programmable frequency generator;
   time reference means for producing signals for a predetermined duration;
   first counter means electrically coupled to said time reference means for counting the signals from said time reference means; and
   comparator means coupled to said storage memory and said first counter means for comparing the first count in said storage memory with the count in said first counter and for providing an output pulse when the first count equals the count in said first counter means, the sum of the output pulses being the rate of the successive events.

5. The rate measurement circuit as in claim 4 wherein a binary coded decimal switch is electrically coupled to said programmable frequency generator.

6. The rate measurement circuit as in claim 4 further including a crystal oscillator being electrically connected to an input of said programmable frequency generator and an input of said time reference means.

7. The rate measurement circuit as in claim 4 further including a reset means coupled between said comparator means and said first counter means, each output pulse from said comparator means providing the resetting of said first counter through said reset means.

8. The rate measurement circuit as in claim 7 wherein said first counter means is a synchronous counter.

* * * * *